United States Patent
Scherer et al.

(10) Patent No.: US 6,468,823 B1
(45) Date of Patent: Oct. 22, 2002

(54) FABRICATION OF OPTICAL DEVICES BASED ON TWO DIMENSIONAL PHOTONIC CRYSTAL STRUCTURES AND APPARATUS MADE THEREBY

(75) Inventors: Axel Scherer, Laguna Beach, CA (US); Marko Loncar, Pasadena, CA (US); Theodor Doll, Ilmenau (DE)

(73) Assignee: California Institute of Technology, Pasadena, CA (US)

( * ) Notice: Subject to any disclaimer, the term of this patent is extended or adjusted under 35 U.S.C. 154(b) by 12 days.

(21) Appl. No.: 09/675,796

(22) Filed: Sep. 29, 2000

Related U.S. Application Data

(60) Provisional application No. 60/157,214, filed on Sep. 30, 1999.

(51) Int. Cl.[7] .............................. H01L 21/00; G02B 6/10
(52) U.S. Cl. .............................. 438/31; 438/29; 438/32; 385/129; 385/130; 385/131; 385/132
(58) Field of Search .............................. 438/31, 29, 32; 385/129–132, 14, 147; 65/385, 386, 391, 393, 415, 472

(56) References Cited

U.S. PATENT DOCUMENTS

| | | | | |
|---|---|---|---|---|
| 5,526,449 A | * | 6/1996 | Meade et al. | 385/1 |
| 6,134,369 A | * | 10/2000 | Kurosawa | 385/129 |
| 6,175,671 B1 | * | 1/2001 | Roberts | 359/177 |
| 6,317,554 B1 | * | 11/2001 | Kosaka et al. | 359/321 |

* cited by examiner

Primary Examiner—Steven Loke
Assistant Examiner—Donghee Kang
(74) Attorney, Agent, or Firm—Daniel L. Dawes; Myers, Dawes & Andras LLP

(57) ABSTRACT

A broad class of devices, both active and passive, such as waveguides, microcavities, filters, resonators, lasers, switches, modulators, etc. can be fabricated using the disclosed method. The method is one in which nanocavities in semiconductor membranes can be fabricated, which method is an advantage regardless of the type of device which is ultimately being fabricated therefrom. The method of the invention is illustrated in the case of a photonic crystals waveguide as being made in a silicon-on-insulator (SOI) material. However, the method is not limited to this type of material and can be used in other equivalent material structures such as AlGaAs, InGaAsP, or the like. The semiconductor membranes which are fabricated incorporate two dimensional photonic crystals for confinement of light in the lateral or in-plane direction and total internal reflection for the confinement in vertical direction.

9 Claims, 3 Drawing Sheets

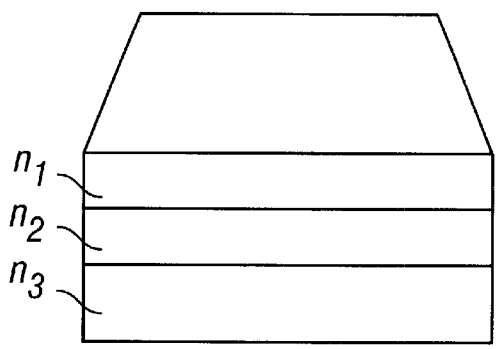
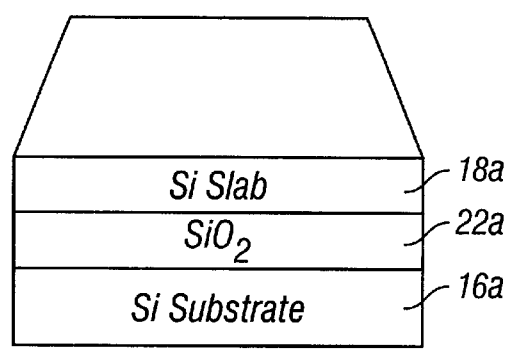
FIG. 1 (Prior Art)
FIG. 2A
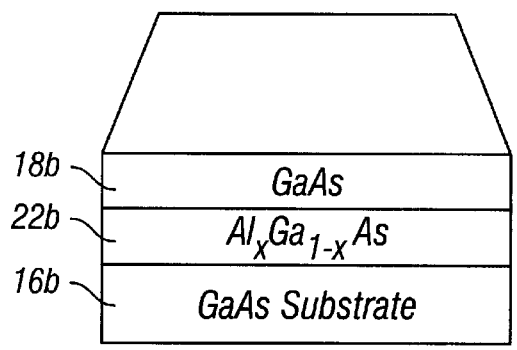
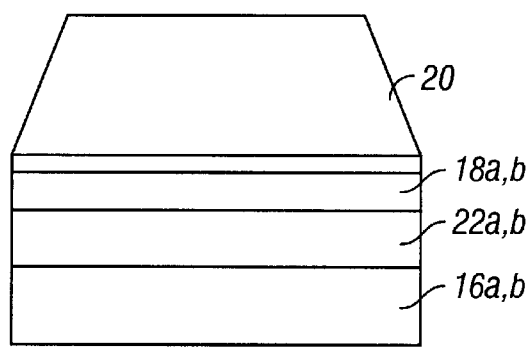
FIG. 2B
FIG. 3A
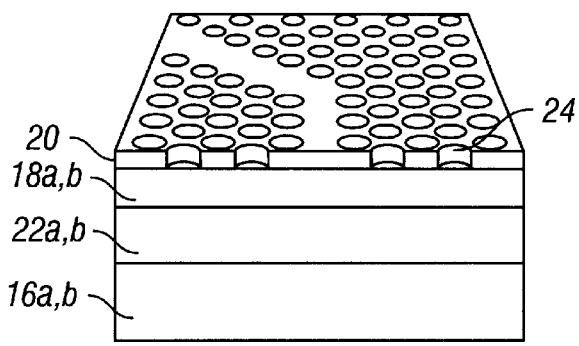
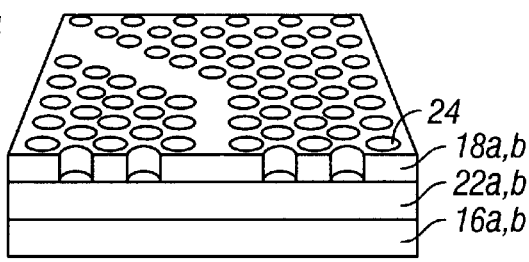
FIG. 3B
FIG. 4

FABRICATION OF OPTICAL DEVICES BASED ON TWO DIMENSIONAL PHOTONIC CRYSTAL STRUCTURES AND APPARATUS MADE THEREBY

RELATED APPLICATIONS

The present application relates back to U.S. Provisional patent application No. 60/157,214 filed on Sep. 30, 1999.

BACKGROUND OF THE INVENTION

1. Field of the Invention

The invention relates to a method of making optical devices that guide light, and in particular that incorporate two dimensional photonic crystals for confinement of light.

2. Description of the Prior Art

High reflectivity mirrors have been a key ingredient to reducing the modal volume of optical laser cavities. In 1991, the operation of ultra-small cavities with lateral dimensions of 400 nm diameters was realized. The mode volume in these lasers was still rather large, approximately two cubic wavelengths due to the deep penetration of light into the mirrors.

Microdisk lasers with similar mode volumes emerged in 1993 and relied on high cavity Qs resulting from total internal reflection of light from the perimeter of the disk. In these devices, the light is guided in a thin slab, and reflects as whispering gallery modes along the circumference of the circular laser cavity. Consequently, bend losses become prohibitively large in devices with diameters below 1.5 microns.

What is needed is a design and fabrication technique by which one can fabricate nanocavities in room temperature devices.

BRIEF SUMMARY OF THE INVENTION

The invention is defined as a method of fabricating a semiconductor membrane having a two dimensional, photonic, crystal semiconductor device defined therein comprising the steps of disposing or defining the thickness of a semiconductor membrane or layer on a lower index substrate and patterning the semiconductor membrane with a pattern of vertical holes disposed or etched therethrough, and undercutting the semiconductor membrane or positioning the semiconductor layer onto the low refractive index substrate. The pattern of holes define a region of the semiconductor layer, which is the two dimensional photonic crystalline semiconductor device. A membrane is formed in which the semiconductor layer laterally at least partially confines light by the pattern of holes and which vertically at least partially confines light by total internal reflection.

In one embodiment the step of forming the membrane comprises undercutting the semiconductor layer to define a waveguiding membrane. In another embodiment the step of forming the membrane comprises epitaxially lifting the semiconductor layer off the substrate and disposing the semiconductor layer between two layers of other materials having a lower index of refraction than the semiconductor layer to define the waveguiding membrane. In one embodiment the step of disposing the semiconductor layer between two layers of other materials to define the waveguiding membrane comprises disposing the semiconductor layer between two layers of glass.

The step of disposing or defining the thickness of the semiconductor layer comprises disposing the semiconductor layer on a silicon on insulator (SOI) substrate, or more specifically oxidizing the silicon membrane and removing the formed $SiO_2$ layer using HF acid. For example, the semiconductor layer is disposed on a Si layer on a $SiO_2$ clad Si substrate, or alternatively on a GaAs layer on an AlAs clad GaAs substrate.

The step of patterning the semiconductor layer comprises patterning the mask on the semiconductor layer by means of electron beam lithography and patterning the semiconductor layer by means of chemically assisted ion beam etching or any other type of wet or dry etching technique.

Although the method of the invention has been described as steps, it is to be expressly understood that the methodology is generally defined by the claims and is not limited to the disclosed specification under the construction of 35 USC 112. The invention further comprises a membrane and semiconductor devices made from membranes. The invention can be better visualized by turning to the following drawings wherein like elements are referenced by like numerals.

BRIEF DESCRIPTION OF THE DRAWINGS

FIG. 1 is a side cross-sectional view in enlarged scale of a prior art photonic membrane.

FIG. 2a is a side cross-sectional view in enlarged scale of a wafer used to make a photonic according to the invention.

FIG. 2b is a side cross-sectional view in enlarged scale of a AlGaAs wafer used to make a photonic crystal membrane according to the invention.

FIGS. 3a and 3b are perspective cross-sectional view of the samples of FIGS. 2a and 2b illustrating the sample fabrication before and after lithographic patterning.

FIG. 4 is a perspective cross-sectional view of the samples of FIGS. 2a and 2b illustrating the sample fabrication after the etching step and removal of the lithography mask.

Figure 5A:
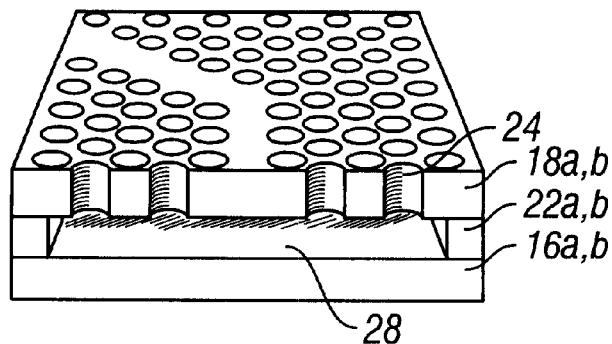
FIGS. 5a and 5b are perspective cross-sectional view of the samples of FIGS. 2a and 2b illustrating the sample fabrication after the final fabrication step, namely undercutting.
Figure 5B:
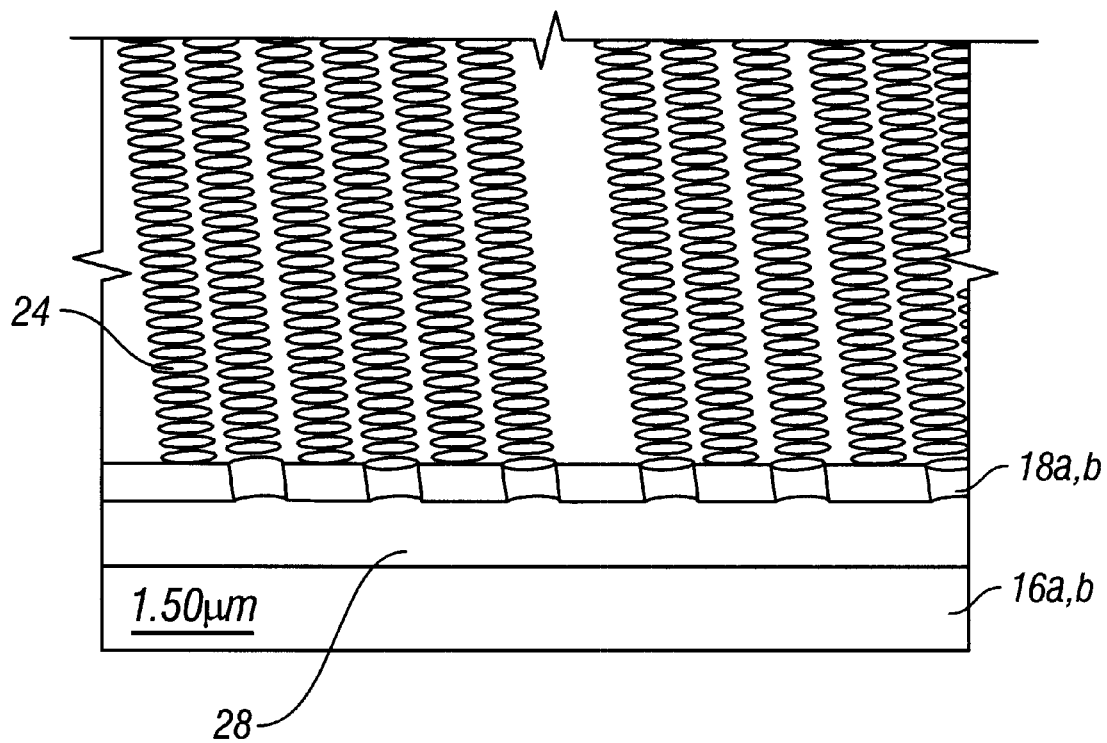

The invention and its various embodiments may now be better understood by turning to the following detailed description of the preferred embodiments.

DETAILED DESCRIPTION OF THE PREFERRED EMBODIMENTS

A broad class of devices, both active and passive, such as waveguides, microcavities, filters, resonators, lasers, switches, modulators, etc. can be fabricated using the disclosed method. The method is one in which nanocavities in semiconductor membranes can be fabricated, which method is an advantage regardless of the type of device which is ultimately being fabricated therefrom. The method of the invention is illustrated in the case of a photonic crystals waveguide as being made in a silicon-on-insulator (SOI) material. However, the method is not limited to this type of material and can be used in other equivalent material structures such as AlGaAs, InGaAsP, or the like. The semiconductor membranes which are fabricated incorporate two dimensional photonic crystals for confinement of light in the lateral or in-plane direction and total internal reflection for the confinement in vertical direction.

Three dimensional photonic crystals would be a preferred material to control the flow of the light in solids because they are characterized by a full frequency bandgap, i.e., the light with a frequency that falls in the forbidden region cannot propagate in any spatial direction. However, three dimensional photonic crystals are difficult to fabricate. Because of that, most of the optical devices based on photonic bandgap (PBG) structures which incorporate two dimensional photonic crystals for lateral confinement of the light and total internal reflection for the confinement in vertical direction. The high refractive index contrast required to achieve total internal reflection is achieved by alternating low and high refractive index layers, as shown in the FIG. 1. The highest contrast is achieved when the index of refraction of upper layer 10 and lower layer 12, $n_1=n_3=1$, that is when the middle layer or slab 14 is a waveguiding membrane.

In the method of invention we start with SOI wafer (FIG. 2a), that is a silicon substrate with an overlying $SiO_2$ layer and Si layer on top of the $SiO_2$ layer, or an AlGaAs wafer (FIG. 2b), that is GaAs substrate with $Al_xGa_{1-x}As$ layer on top of it and GaAs layer on top of the $Al_xGa_{1-x}As$ layer. In the case of AlGaAs wafer, layer 18b may also include quantum well structures depending on the type of photonic device being made. In order to make single mode device with wide bandgap, layers 18a and 18b should have thickness of about $d \approx \lambda_0/2n_1$ where $\lambda_0$ is the wavelength in the air and $n_1$ is refractive index of layer 18a or 18b (Si or GaAs respectively). If the layer 18a is thicker, it can be made thinner by oxidizing it from the top and removing the formed $SiO_2$ layer with HF acid.

The sample in FIG. 2a or 2b is then coated with a mask layer 20 that will be used during a lithography step to define the desired pattern as shown in FIG. 3. The pattern will vary depending on the device which is being fabricated and as such is not a limiting design constraint on the method of making perforated membranes and the general topology of such membranes. In the illustrated embodiment an electron beam sensitive mask layer 20, e.g. a polymethylmethacyclate layer (PMMA), is used since two dimensional photonic crystals patterns are defined using electron beam lithography. However, any other high resolution lithography technique would suffice, such as x-ray, deep UV, extreme UV lithography, nano-stamping and nano-molding.

Patterning of the sample with the two dimensional photonic crystals structure using one of the lithography techniques is then performed as diagrammatically illustrated in the perspective cross-sectional view in FIG. 3b. In the invention a plurality of patterned holes 24 are defined through PMMA layer 20.

The pattern of holes 24 is then transferred from the mask layer 20 into the Si layer 18a or GaAs layer 18b by means of chemically assisted ion beam etching (CAIBE) or any other directional etching technique. The reactive gas used in this process is $XeF_2$. Holes 24 are etched all the way through Si layer 18a or GaAs layer 18b and a little bit into the $SiO_2$ layer 22a or AlAs layer 22b respectively as shown in FIG. 4. In the case of the AlGaAs based system of FIG. 2b the pattern is transferred through the GaAs using CAIBE and Cl as reactive gas.

PMMA layer 20 is then removed using acetone or oxygen plasma etching, for example. Layer 22a or 22b are then removed, and free standing membrane is formed, from layer 18a or 18b, by undercutting using conventional wet or dry etching techniques to create an undercut air region 28. In the illustrated embodiment HF wet etching through holes 24 was used in order to etch away $SiO_2$ layer 22a. $Al_xGa_{1-x}As$ layer 22b in the AlGaAs structure of FIG. 2b can be removed in the some way. In another embodiment $Al_xGa_{1-x}As$ layer can be converted to aluminum-oxide layer ($AlO_x$) by oxidizing the $Al_xGa_{1-x}As$ layer using wet (or dry) oxidation techniques through the etched holes. The final structure is shown in FIGS. 5a and b.

Figure 6:
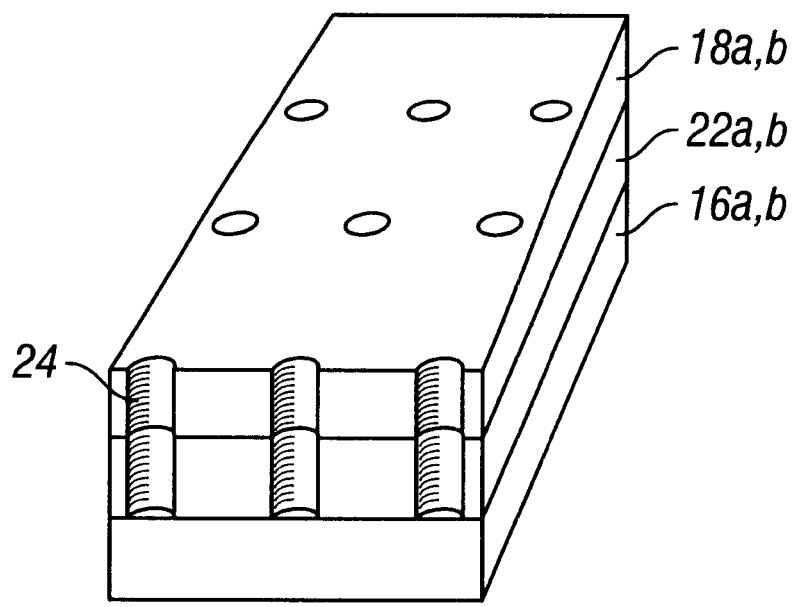
FIG. 6 is a perspective cross-sectional view of the samples of FIGS. 2a and 2b which are ultimately fabricated with an alternative final form.

It is of course understood that the method described above may be altered in a large number of ways without departing from the scope and spirit of the invention. For example, instead of removal of PMMA layer 20 and undercutting through holes 24, it is also possible to use reactive ion etching (RIE) of layer 22a, b in order to transfer the pattern from layer 18a into layer 22a. The final structure is shown in the FIG. 6. In this case there is no waveguiding membrane, but total internal reflection can still be used for vertical confinement of the light since $SiO_2$ has smaller refractive index than Si. In the case of AlGaAs the method continues with the use of CAIBE to perforate $Al_xGa_{1-x}As$ layer 22b completely and then convert it into a low refractive index aluminum oxide layer by oxidation through the etched holes.

Figure 7:
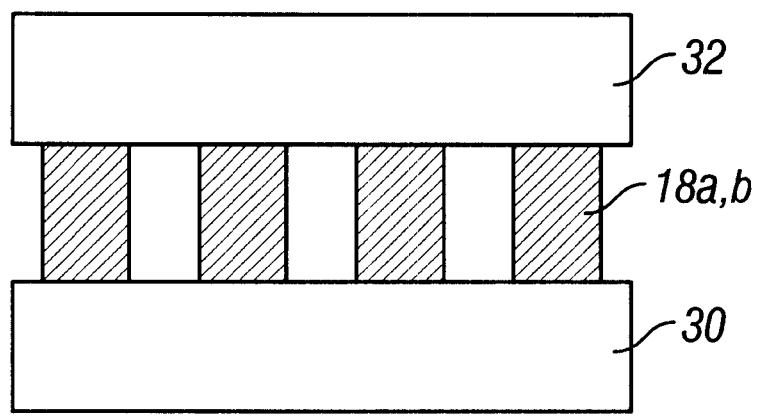
FIG. 7 is a perspective cross-sectional view of the sample of FIG. 6 illustrating the sample fabrication after the final fabrication steps.

In alternative embodiment, Si layer (18a) or GaAs layer (18b) is pealed off by epitaxial lift off and then bonded onto any low refractive index substrate 30 (glass, organic polymer layer, etc.) by Van Der Waal's forces and covered with another low refractive index material 32 (air, glass, organic polymer layer, etc.). The pealed of membrane can be patterned prior or after it is covered with low refractive index material 32. Total internal reflection is again made possible since $n_{30,32} < n_{18a, b}$. The resulting device is shown in side cross-sectional view in enlarged scale in FIG. 7.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of fabricating a semiconductor membrane having a two dimensional, photonic crystalline semiconductor cavity defined therein comprising:

disposing a semiconductor layer on a substrate;

patterning said semiconductor layer with a pattern of vertical holes disposed there through, said pattern of holes defining a region of said semiconductor layer, which is said two dimensional photonic crystal semiconductor cavity; and forming a membrane in which said semiconductor layer laterally at least partially confines light by said pattern of holes and which vertically at least partially confines light by total internal reflection, where forming said membrane comprises undercutting said semiconductor layer to define a waveguiding membrane.

2. The method of claim 1 where disposing said semiconductor layer on said substrate comprises disposing said semiconductor layer on an insulating substrate.

3. The method of claim 1 further comprising a mask layer on said semiconductor layer and where patterning said semiconductor layer comprises patterning said mask layer by means of high resolution lithography.

4. The method of claim 3 where patterning said semiconductor layer comprises patterning said semiconductor layer by means of chemically assisted ion beam etching.

5. The method of claim 1 where patterning said semiconductor layer comprises patterning said semiconductor layer by means of a directional ion beam etching technique.

6. A method of fabricating a semiconductor membrane having a two dimensional, photonic crystalline semiconductor cavity defined therein comprising:

disposing a semiconductor layer on a substrate;

patterning said semiconductor layer with a pattern of vertical holes disposed there through, said pattern of holes defining a region of said semiconductor layer, which is said two dimensional photonic crystal semiconductor cavity; and forming a membrane in which said semiconductor layer laterally at least partially confines light by said pattern of holes and which vertically at least partially confines light by total internal reflection, where forming said membrane comprises epitaxially lifting said semiconductor layer off said substrate and disposing said semiconductor layer between two layers of other materials having a lower index of refraction than said semiconductor layer or directly on a lower index of refraction layer to define said waveguiding membrane.

7. The method of claim 1 where disposing said semiconductor layer between two layers of other materials having a lower index of refraction than said semiconductor layer to define said waveguiding membrane comprises disposing said semiconductor layer between two layers of glass.

8. The method of claim 7 where disposing said semiconductor layer on an insulating substrate comprises disposing a Si layer on a $SiO_2$ clad Si substrate.

9. The method of claim 7 where disposing said semiconductor layer on an SOI substrate comprises disposing a GaAs layer on an AlAs clad GaAs substrate.

* * * * *